No. 717,669. PATENTED JAN. 6, 1903.
E. E. FLORA.
MACHINE FOR RULING SCREENS OR PLATES FOR PHOTOGRAPHIC PURPOSES.
APPLICATION FILED DEC. 4, 1899. RENEWED MAY 14, 1902.
NO MODEL. 11 SHEETS—SHEET 5.
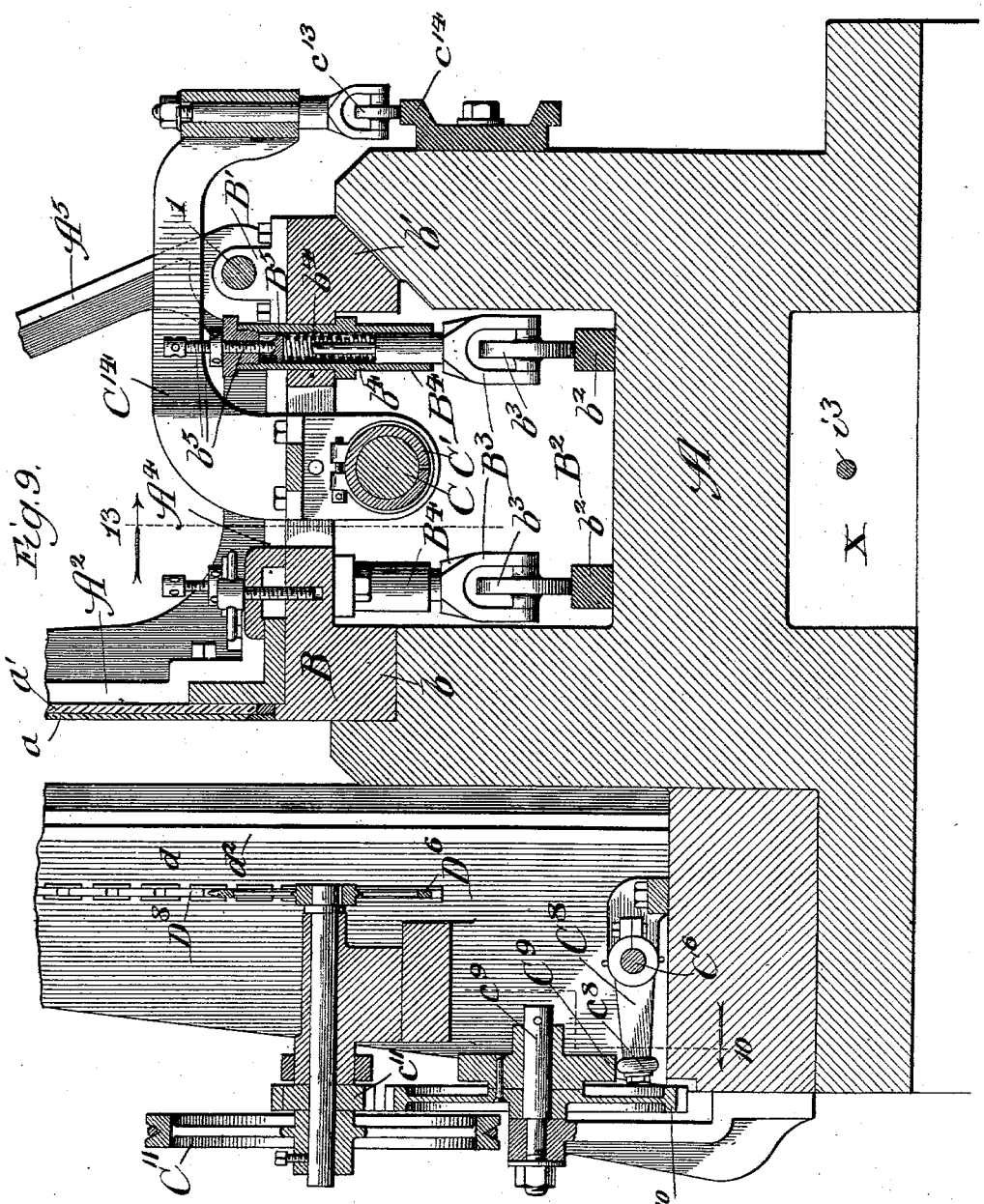

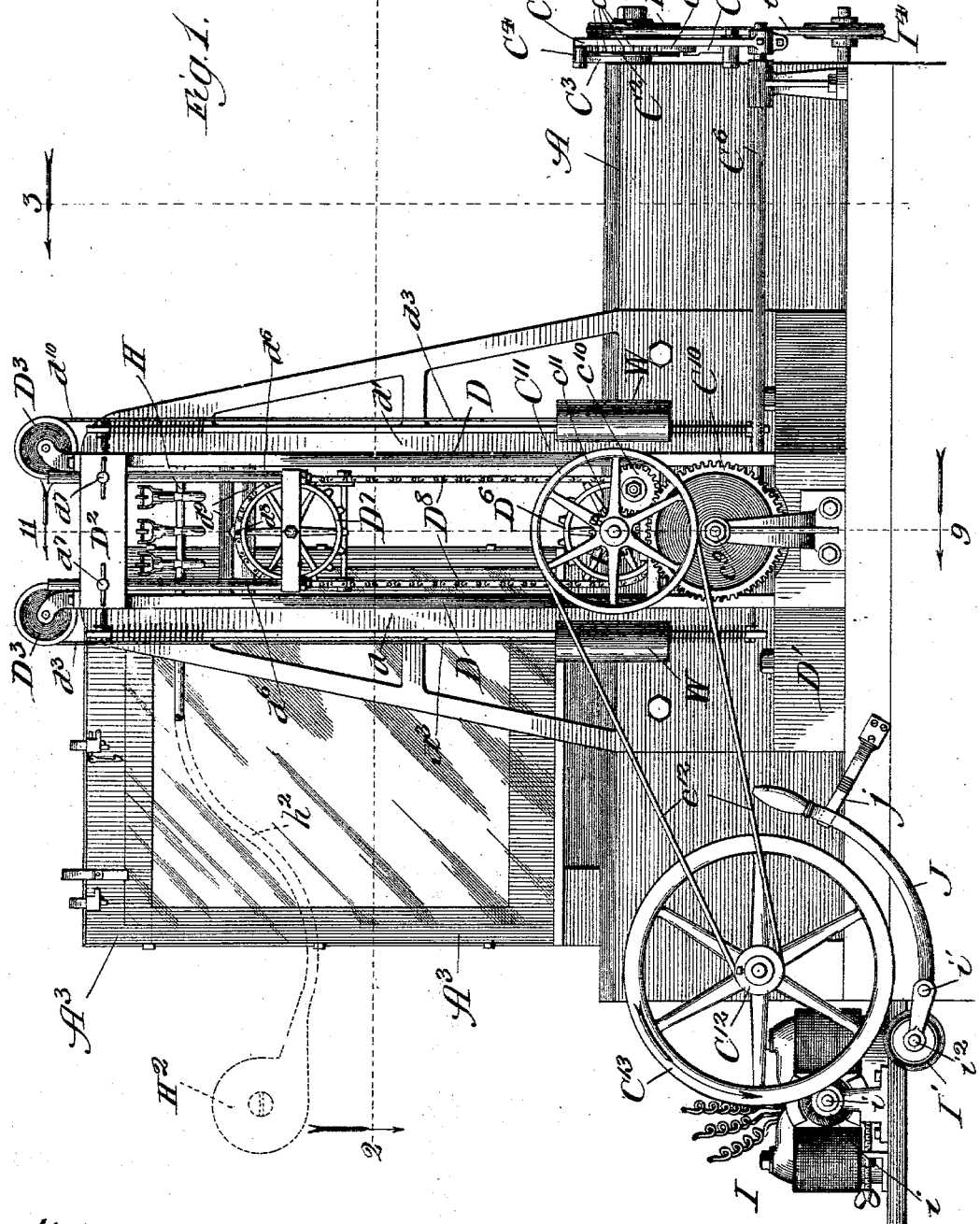

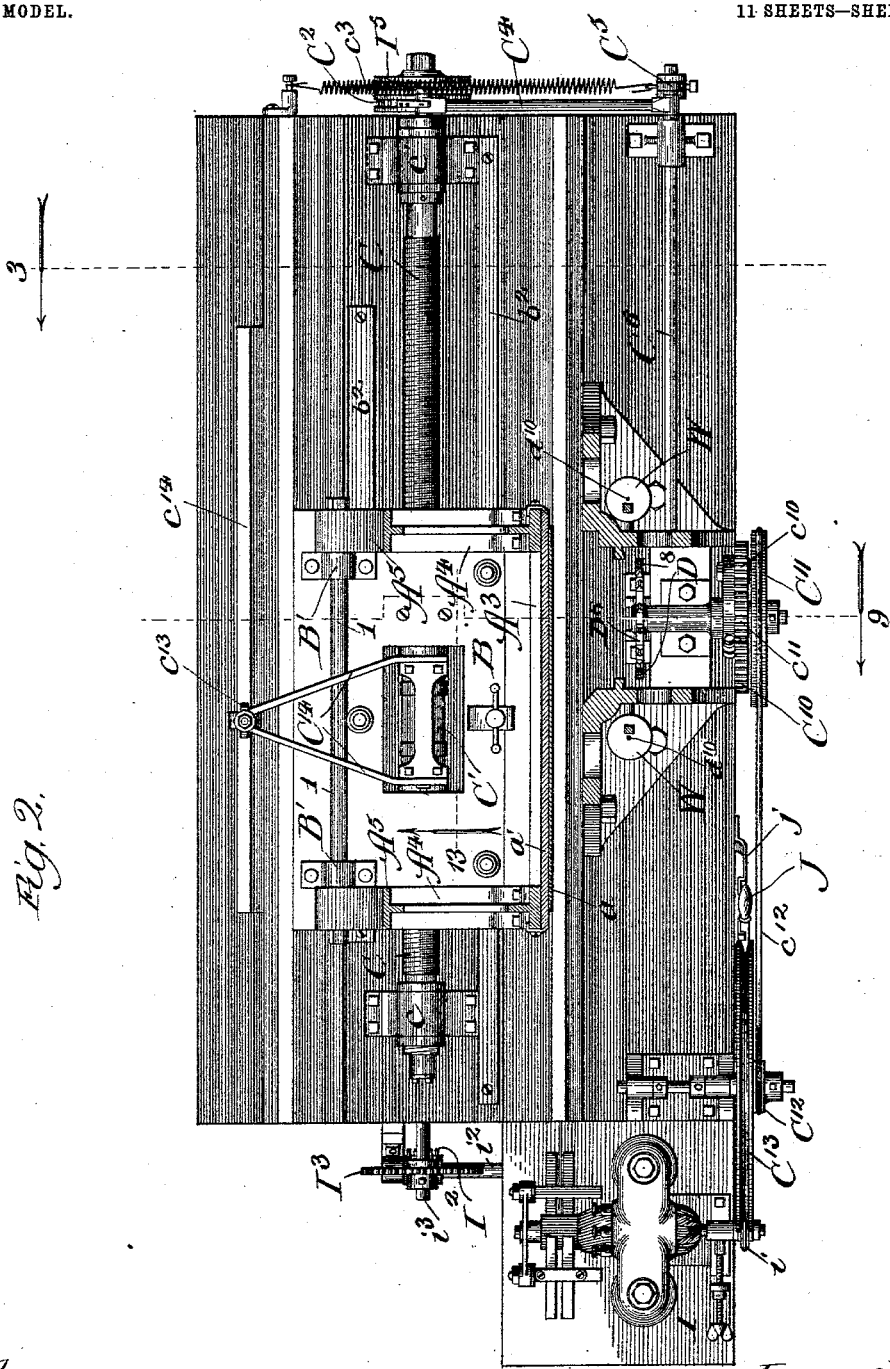

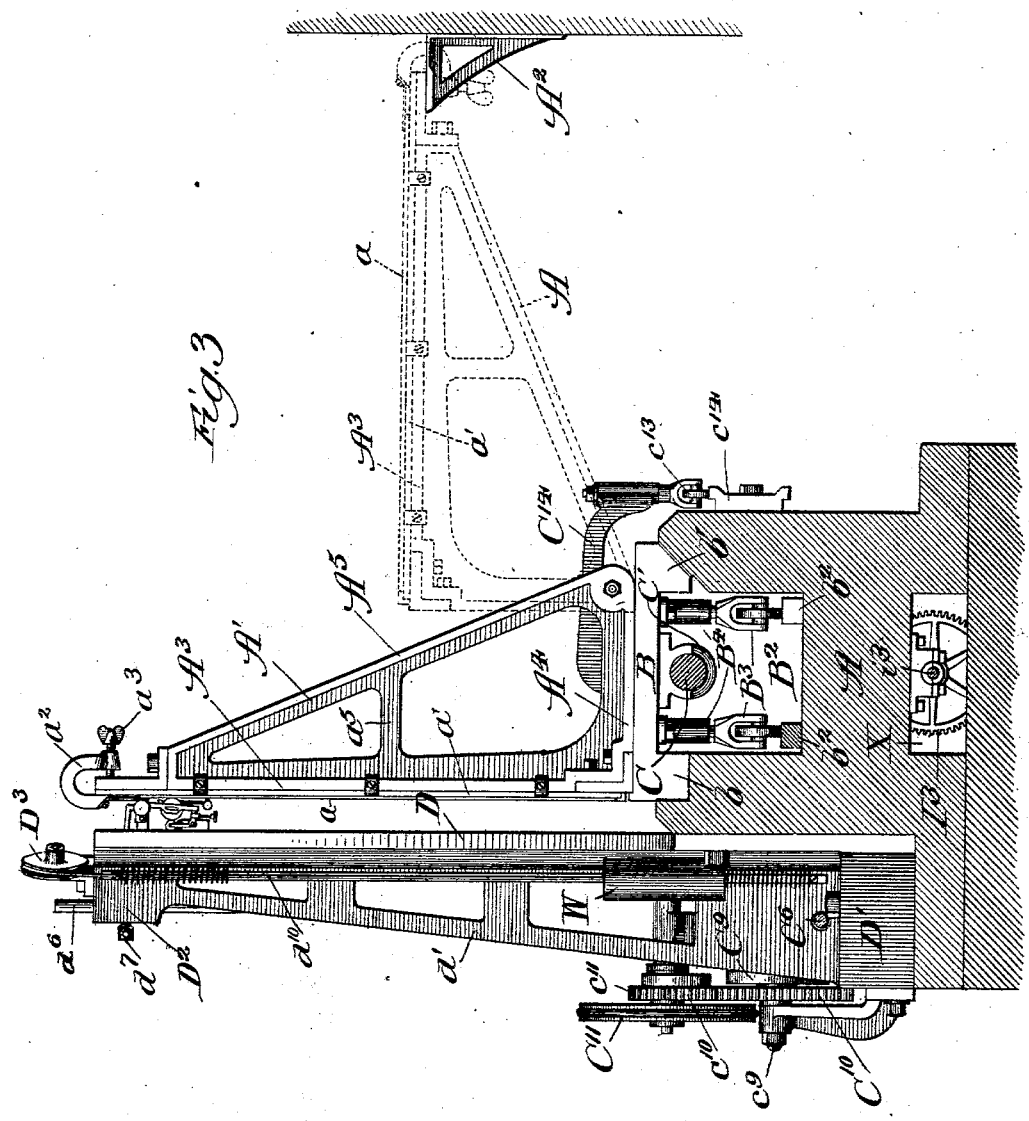

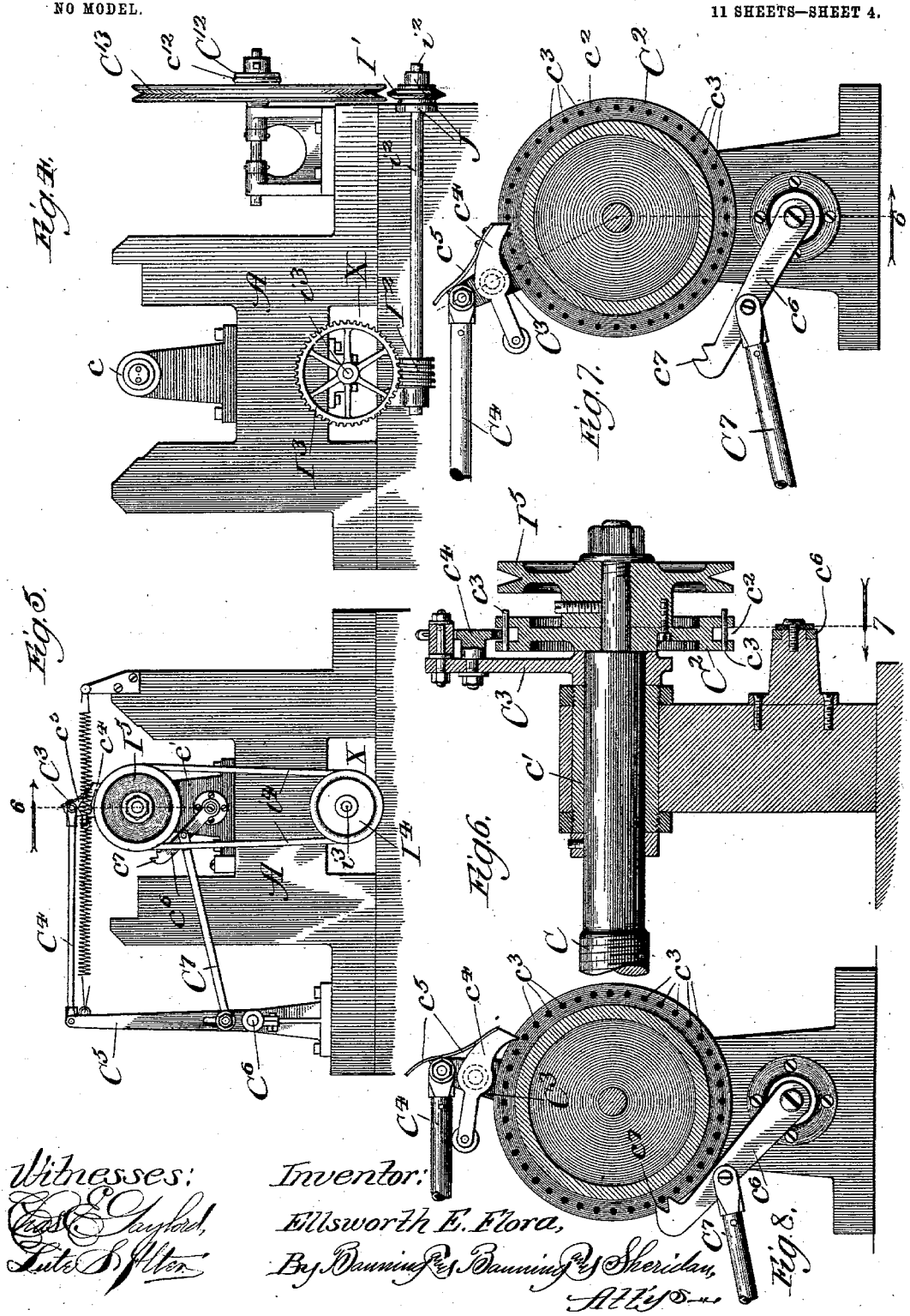

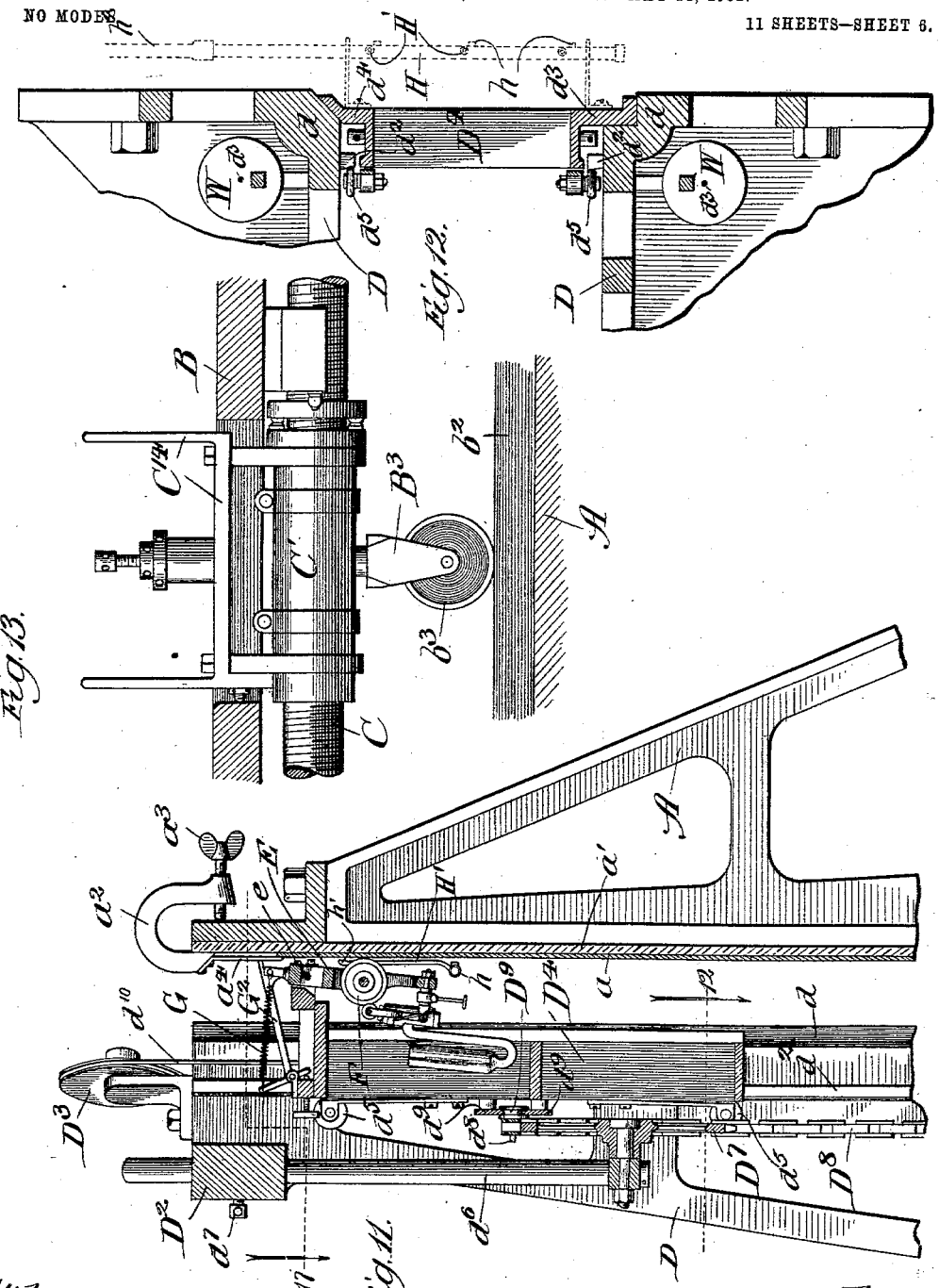

No. 717,669. PATENTED JAN. 6, 1903.
E. E. FLORA.
MACHINE FOR RULING SCREENS OR PLATES FOR PHOTOGRAPHIC PURPOSES.
APPLICATION FILED DEC. 4, 1899. RENEWED MAY 14, 1902.
NO MODEL. 11 SHEETS—SHEET 7.
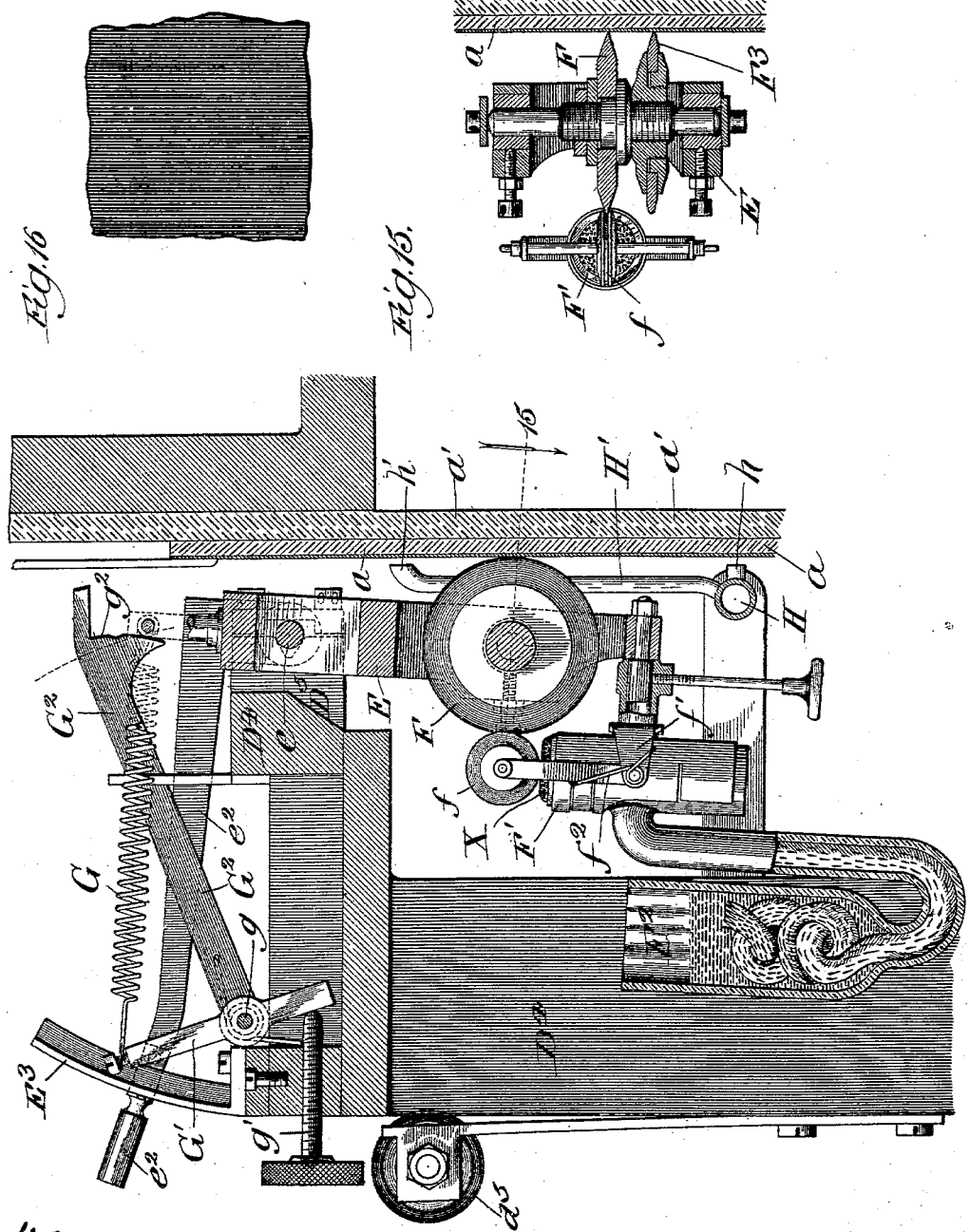
Witnesses:
Inventor:
Ellsworth E. Flora, No. 717,669. PATENTED JAN. 6, 1903.
E. E. FLORA.
MACHINE FOR RULING SCREENS OR PLATES FOR PHOTOGRAPHIC PURPOSES.
APPLICATION FILED DEC. 4, 1899. RENEWED MAY 14, 1902.
NO MODEL. 11 SHEETS—SHEET 8.

Witnesses: Inventor:
Ellsworth E. Flora.
By Banning & Banning & Sheridan
Attys.

No. 717,669. PATENTED JAN. 6, 1903.
E. E. FLORA.
MACHINE FOR RULING SCREENS OR PLATES FOR PHOTOGRAPHIC PURPOSES.
APPLICATION FILED DEC. 4, 1899. RENEWED MAY 14, 1902.
NO MODEL. 11 SHEETS—SHEET 9.

Witnesses:
Inventor:
Ellsworth E. Flora,
By Banning & Banning & Sheridan,
Att'ys No. 717,669. PATENTED JAN. 6, 1903.
E. E. FLORA.
MACHINE FOR RULING SCREENS OR PLATES FOR PHOTOGRAPHIC PURPOSES.
APPLICATION FILED DEC. 4, 1899. RENEWED MAY 14, 1902.
NO MODEL. 11 SHEETS—SHEET 10.
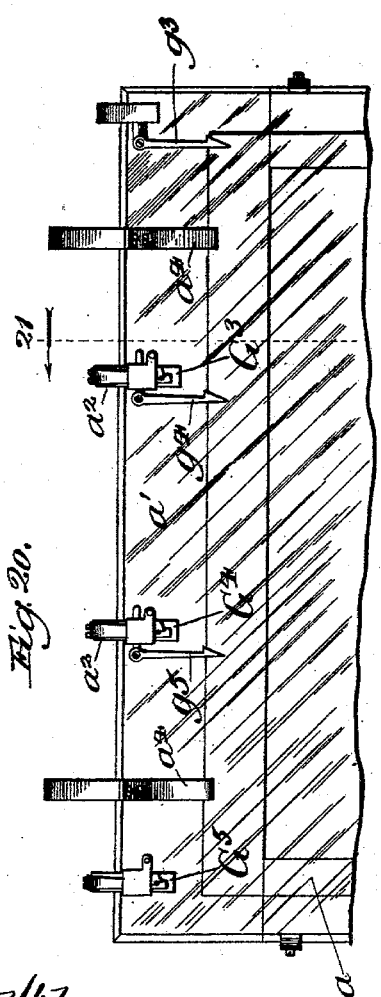
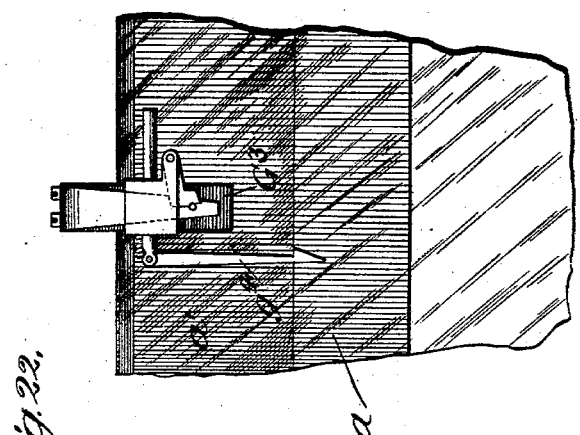
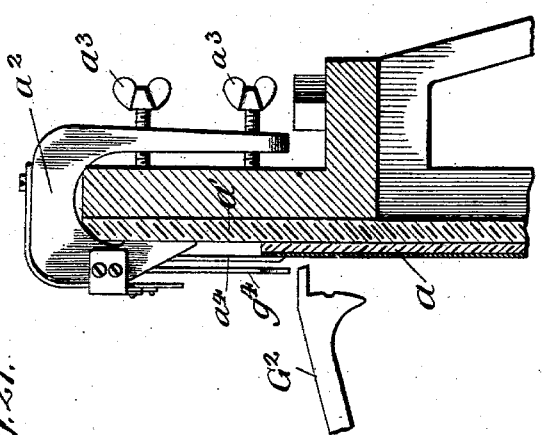
Witnesses:
Inventor:
Ellsworth E. Flora, No. 717,669. PATENTED JAN. 6, 1903.
E. E. FLORA.
MACHINE FOR RULING SCREENS OR PLATES FOR PHOTOGRAPHIC
PURPOSES.
APPLICATION FILED DEC. 4, 1899. RENEWED MAY 14, 1902.
NO MODEL. 11 SHEETS—SHEET 11.
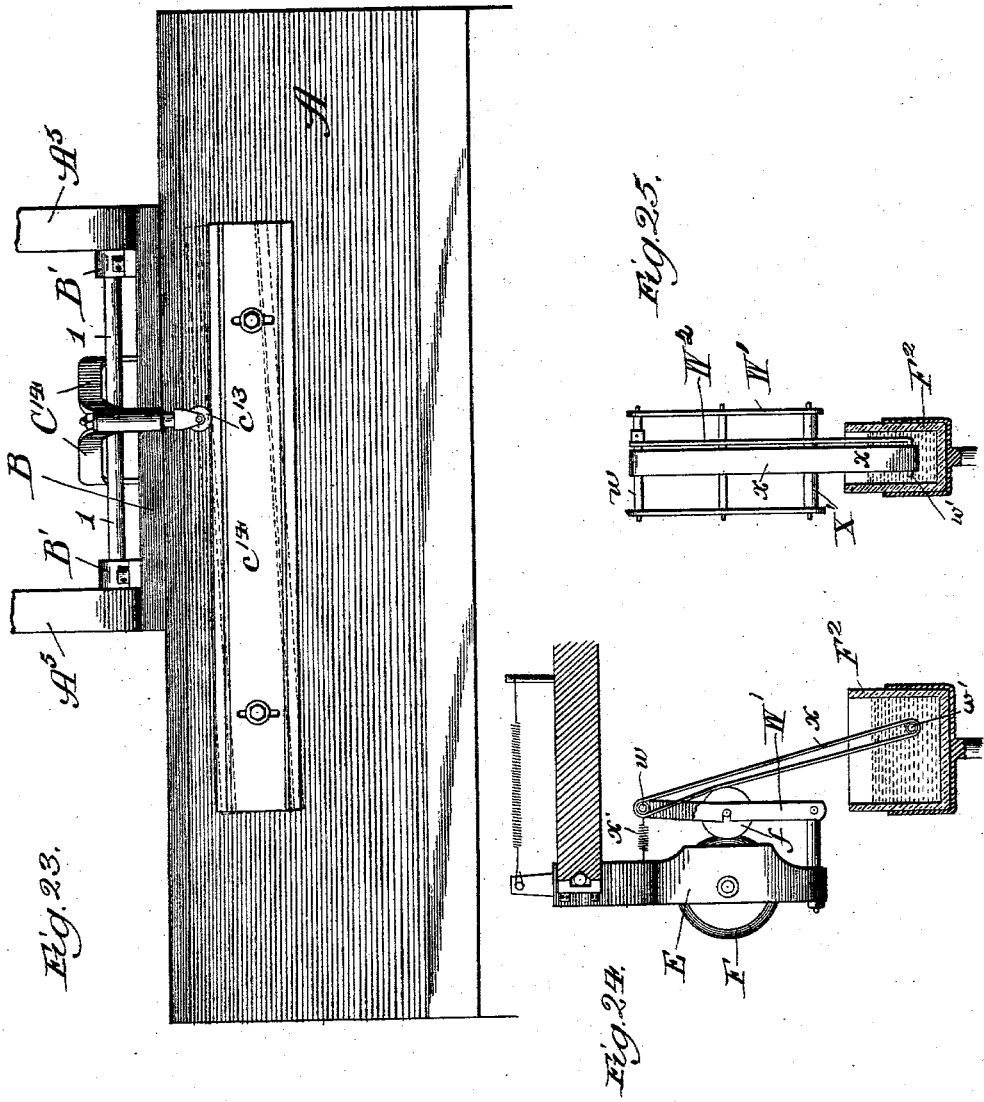

UNITED STATES PATENT OFFICE.

ELLSWORTH E. FLORA, OF CHICAGO, ILLINOIS, ASSIGNOR, BY MESNE ASSIGNMENTS, TO GEORGE FARNSWORTH, TRUSTEE, OF CHICAGO, ILLINOIS.

MACHINE FOR RULING SCREENS OR PLATES FOR PHOTOGRAPHIC PURPOSES.

SPECIFICATION forming part of Letters Patent No. 717,669, dated January 6, 1903.

Application filed December 4, 1899. Renewed May 14, 1902. Serial No. 107,300. (No model.)

*To all whom it may concern:*

Be it known that I, ELLSWORTH E. FLORA, a citizen of the United States, residing at Chicago, Illinois, have invented certain new and useful Improvements in Machines for Ruling Screens or Plates for Photographic Purposes, of which the following is a specification.

The object of my invention is to make a machine by which colors used in color photography or for other purposes may be ruled or placed on a glass plate or other surface to which they are to be applied readily, accurately, rapidly, economically, and with the fineness and delicacy required in such work; and my invention consists in the features and details of construction hereinafter described and claimed.

Figure 17:
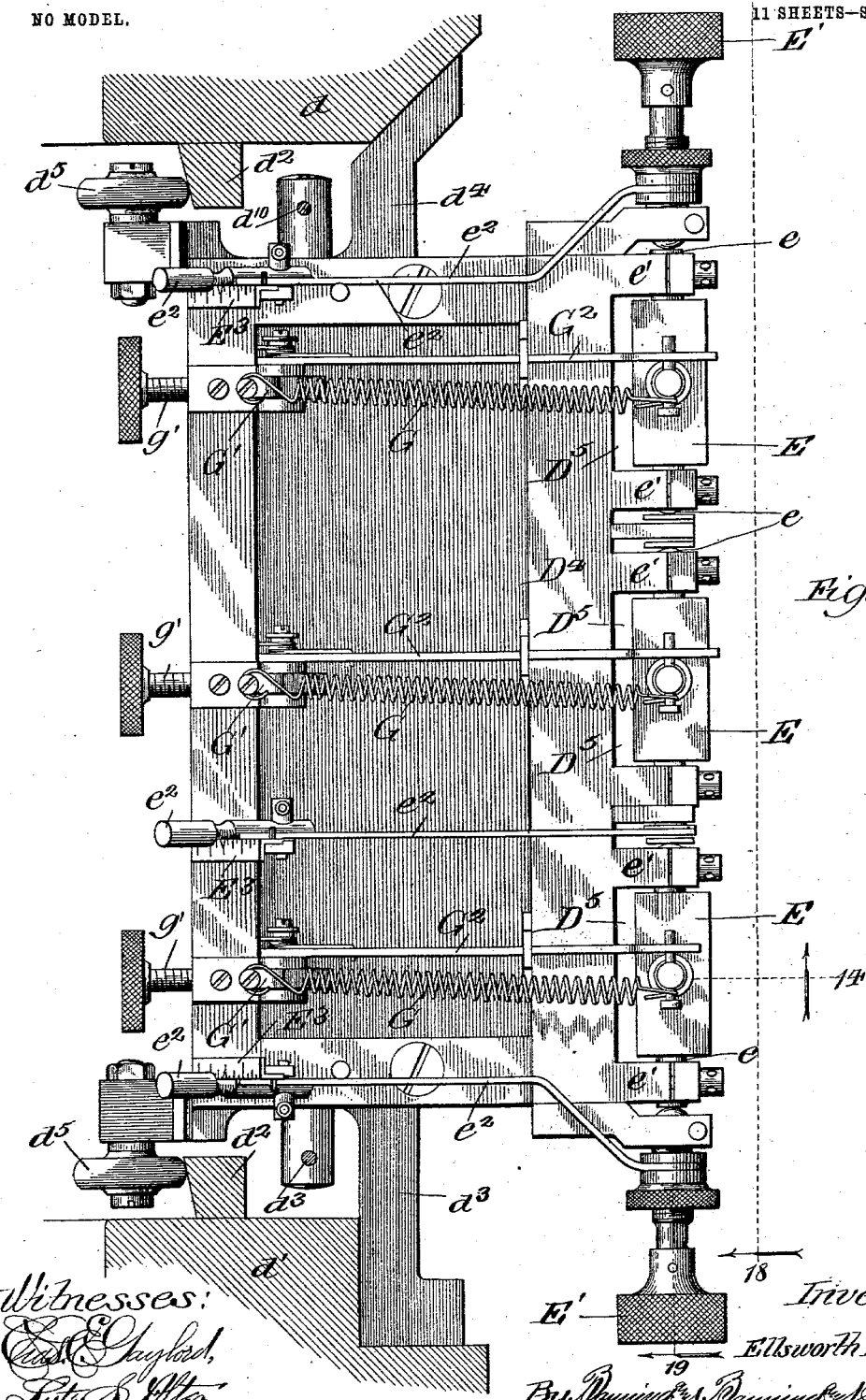
Figure 19:
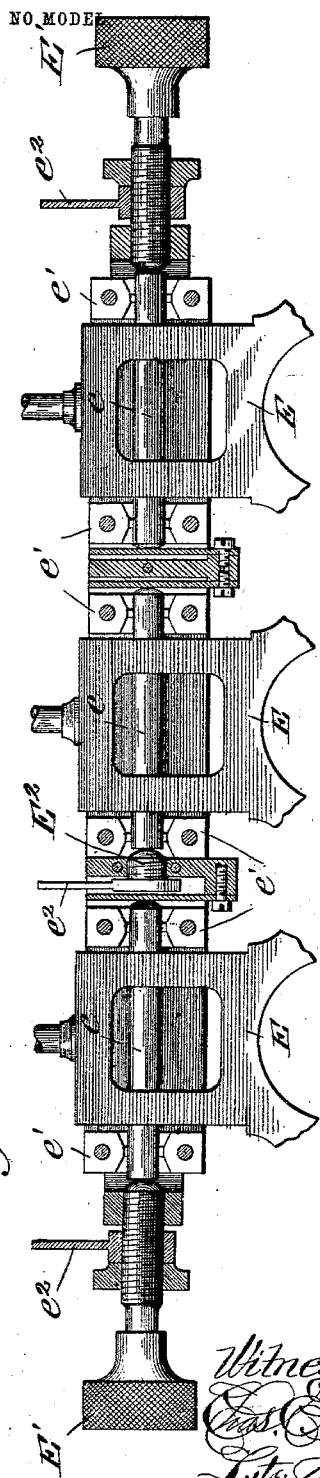
Figure 18:
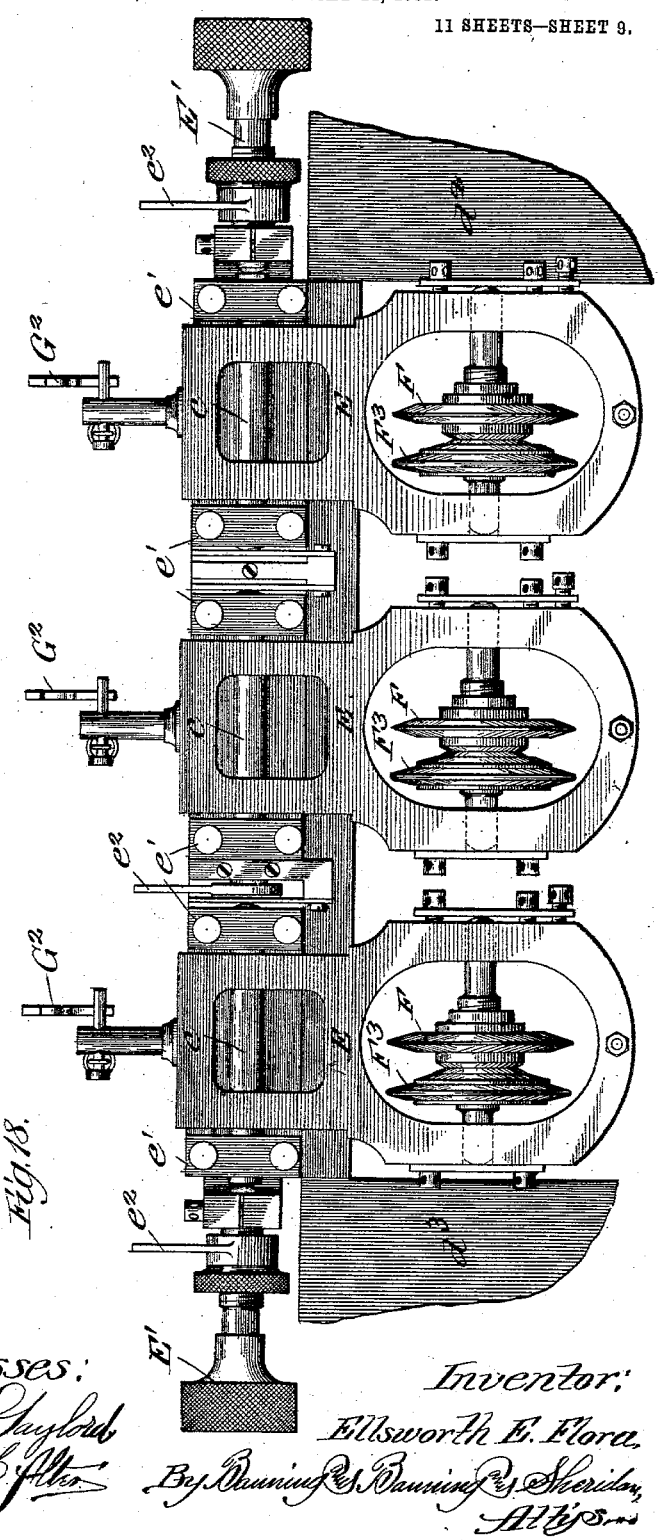

In the drawings, Figure 1 is a front elevation of my improved ruling-machine. Fig. 2 is a plan view of the same, taken in line 2 of Fig. 1. Fig. 3 is a sectional end elevation taken in line 3 of Figs. 1 and 2. Fig. 4 is an end elevation of the end of the frame of the machine farthest from the line 3 of Fig. 1, showing the means employed for reversing the direction of travel of the carriage. Fig. 5 is an end elevation of the frame of the machine nearest the line 3 of Fig. 1, showing the means for effecting the travel of the carriage when at work. Fig. 6 is a vertical longitudinal section taken in line 6 of Figs. 5 and 7. Fig. 7 is an end elevation taken in line 7 of Fig. 6. Fig. 8 is the same as Fig. 7, with the parts in a different position. Fig. 9 is an enlarged sectional elevation of the lower part of the machine, taken in line 9 of Figs. 1 and 2. Fig. 10 is a sectional detail taken in line 10 of Fig. 9. Fig. 11 is an enlarged sectional elevation of the upper part of the machine, taken in line 11 of Fig. 1. Fig. 12 is a plan view of a section taken in line 12 of Fig. 11. Fig. 13 is a front sectional elevation of a portion of the traveling carriage, taken in line 13 of Figs. 2 and 9. Fig. 14 is an enlarged sectional elevation taken in line 14 of Fig. 17. Fig. 15 is a plan view of a section taken in line 15 of Fig. 14. Fig. 16 is a front elevation of a portion of a screen or plate after the same has been ruled. Fig. 17 is a plan view of a section taken in line 17 of Fig. 11. Fig. 18 is a front elevation of the parts shown in Fig. 17, taken in line 18 of Fig. 17. Fig. 19 is a broken sectional elevation of the same, taken in line 19 of Fig. 17. Fig. 20 is a front elevation of the upper portion of the frame which supports the screens or plates as they are ruled. Fig. 21 is an enlarged transverse sectional elevation of the same, taken in line 21 of Fig. 20. Fig. 22 is a front elevation of a portion of a screen or plate, showing one of the plate-holding clamps enlarged. Fig. 23 is a rear elevation of the frame of the machine. Fig. 24 is a side elevation, partly in section, showing modified means for supplying the ink to the ruling-wheel; and Fig. 25 is a front elevation, partly in section, of the same.

In making my improved ruling-machine, as I have the same constructed and in use, I make a supporting bed or base A, which is preferably cast and of the desired size, height, and strength. This supporting-bed is intended to be placed and rest upon any desired solid foundation, preferably rendered as free from shocks, movements, and vibrations as practicable, as the work intended to be done requires great delicacy and accuracy, so that it is desirable, not to say essential, to have as little movement or vibration as possible. The position and arrangement of the supporting-bed will be readily understood from an inspection of Figs. 1 and 3 of the drawings.

As the object of my ruling-machine is, as already stated, to apply or rule colors—as, for instance, such as are used in color photography—upon glass screens, plates, or other surfaces, it is necessary to have mechanism to hold such screens, plates, &c., in proper position to be ruled. For this purpose I employ a frame A', which for convenience I have termed the "plate-holder." This plate-holder is pivoted at its lower rear edge, so that it can be turned back into position convenient for receiving a plate preparatory to ruling the same. The plates which are arranged in the plate-holder to be ruled are of considerable dimensions. In the machine which I am now describing they are twenty-four by thirty inches, and of approximately one-eighth of an inch in thickness. It is to facilitate the insertion and removal of plates of such dimensions that I have found it desirable, not to say essential, to have the plate-holder pivoted, so that it can be swung back into a horizontal position when a plate is to be inserted or removed. As shown in Fig. 3, I have indicated the plate to be ruled by the letter $a$. It will be apparent also that means must be employed in ruling plates of the dimensions above for supporting and sustaining the plate firmly in position, so that it cannot yield or give when the ruling mechanism is at work bearing upon and against its surface or face. To this end I provide the plate-holder with a permanent supporting-back $a'$. (Shown in Fig. 3, and particularly well shown in Fig. 14.) Inasmuch, however, as it is necessary to inspect the ruling from time to time as the work progresses, it is desirable, not to say essential, that this supporting-back shall be made of transparent material, so that the attendant can see through it from the rear of the machine and note the progress and character of the ruling as it is being done. I therefore prefer to employ for this supporting-back heavy plate-glass, which, while presenting a smooth, permanent, and stable support to the plate being ruled, presents practically no obstruction to the inspection of the work from the rear. Means must also be employed to securely clamp both the permanent supporting-back and the plate being ruled to the pivoted frame, so that when the frame is moved up into its vertical position to permit the plate to be ruled there can be no sliding, shifting, or moving of the plate from its initial position from the commencement to the completion of the ruling. To this end I provide clamps $a^2$, preferably in the form of yokes, well illustrated, for instance, in Figs. 11 and 21. These clamps can be provided with thumb-screws $a^3$, by which they may be drawn firmly and securely against the supporting-bed to hold the plate firm and immovable against the plate-holder frame. These clamps are provided with downward projections $a^4$, preferably of a springy or resilient metal and arranged at about the proper distance in front of the supporting-back to permit the insertion of the edge of a plate to be ruled. When it is desired to remove a plate, the thumb-screws can be turned so as to loosen the hold of the clamps on the supporting-back, which thereby causes the loosening of the hold of the spring projections on the plate, so that the plate can be readily removed. When a new plate is inserted, the operation is of course reversed and the thumb-screws turned, so as to tighten the clamps. The springy or resilient character of the projections which bear against the plates will permit the clamps to be sufficiently tightened without danger of breaking the plates. If desired, a bracket $A^2$ may employed to receive and sustain the outer edge of the plate-holder when turned down, as shown in Fig. 3. As will be seen, the plate-holder consists of a skeleton having a rectangular frame $A^3$ at its front, against which the supporting-back is intended to rest and to be clamped, as already explained. This frame is provided with a horizontal base $A^4$ and with inclined rear braces $A^5$. This gives the frame of the plate-holder a triangular appearance when viewed from the end, as will be readily understood from an inspection of Fig. 3. Cross end braces $a^5$ may also be employed, if desired, to impart still greater strength and rigidity to the frame.

I have now described the means employed for holding the plates of glass in position to have the different colors, dyes, or inks ruled on them. It will of course be understood that means must be employed for shifting either the ruling mechanism or the plate being ruled, so that the lines can be laid or ruled side by side over the face or surface of the plate. In the mechanism which I am now describing I employ means for shifting the plate laterally at predetermined intervals, so as to effect the proper placement of the lines of colored inks or dyes, while the ruling mechanism remains stationary or unshiftable laterally while performing its work. To this end I have pivotally mounted the plate-holder on a carriage B, adapted to be moved longitudinally on the supporting base or bed. This longitudinally-movable carriage is preferably formed of a casting of suitable dimensions to receive the plate-holder and to rest and move upon the face or bed. In the machine that I am describing, which, as already explained, is intended to rule plates of twenty-four by thirty inches in dimensions, the carriage-casting is made approximately fourteen by twenty-eight inches and of sufficient thickness to insure rigidity and non-liability to give or spring in performing its work. As a matter of fact, I make it in the machine under consideration about one inch and a half in thickness, though of course I do not propose to limit myself to any exact dimensions. It is provided with two downwardly-projecting flanges $b$ and $b'$, adapted to be received into appropriate grooves or ways arranged in the base or bed for the purpose, as will be readily understood from an inspection of Figs. 3 and 9. As illustrated in these figures, it will be seen that the forward track or way, intended to receive the flange $b$, is made rectangular or with two plane faces—one vertical and one horizontal—while the rearward track or way, intended to receive the flange $b'$, is made beveled or inclined. In like manner the flanges of the traveling carriage are made correspondingly-shaped, so as to insure a proper fit and complement of the parts. By making the rearward way or track beveled or inclined I insure the proper holding of the traveling carriage in its forward position notwithstanding wear and the pressure of the ruling mechanism against the plates, which would tend, possibly, to push the carriage and plate-holder back and away from their working position. To permit the plate-holder frame to be pivotally connected to the traveling carriage, I provide the carriage with upwardly-extending ears or lugs B', having holes of a desired diameter passing horizontally through them to receive a rod $l$, passed through corresponding holes in the lower edge of the frame, as will be readily understood from an inspection of Figs. 2, 3, and 23. This permits the plate-holder to be swung back into the position shown in Fig. 3, as already explained. To facilitate the movement of the traveling carriage back and forth, I arrange a longitudinal channel $B^2$, running through the base or bed from one end to the other, and arrange in the bottom of this channel at its front and rear edges rails or tracks $b^2$, running longitudinally from one end of the bed to the other. I arrange hangers $B^3$, depending from the carriage and carrying wheels or rolls $b^3$, adapted to travel upon the rails or tracks. These depending hangers pass up into a hollow sleeve $B^4$, in which are arranged coil-springs $b^4$, adapted to yield a desired amount under pressure, so that the traveling carriage and the plate-holder will be yieldably supported, and thus the liability to jars and vibrations minimized. Means are employed, as will be understood from an inspection of Fig. 9, for adjusting or regulating the tension of the springs, as may be desired or as may be required from time to time. One of the sleeves $B^4$ in Fig. 9 is shown in section, so that a follower $B^5$ can be arranged above the top of the spring and moved or adjusted down by means of a screw $b^5$. These devices, however, will be so readily understood that I do not feel that I need describe them in detail. In operation it is intended that the tension of the springs shall be adjusted to that point where practically all the weight of the carriage and the plate-holder shall be carried by the wheels, and so that the traveling carriage shall be practically carried free from the base or bed, or at least with such slight frictional contact therewith as to permit it to move back and forth with ease and without friction. Furthermore, after a plate has been ruled and the plate-holder turned down into the position shown in Fig. 3 and the plate removed the diminution in weight caused by the removal of the plate will permit the carriage to rise sufficiently from the base or bed to enable it to be run back to its initial position with facility and expedition, after which a new plate may be inserted, and the additional weight occasioned thereby imposed upon the springs and rolls will bear the traveling carriage down to its original position.

I have now come to the means for causing the traveling carriage, with the plate-holder mounted on it, to move back and forth during the performance of work. These means consist of a screw C and a nut C', with their associated parts. This screw and nut in order to perform the work to which I apply them are required to be externally and internally threaded with great accuracy and precision. It will be understood, of course, that the screw is mounted and sustained in proper bearings $c$ and $c'$ near the ends of the base or bed and that the nut or block C' is attached or fastened to the carriage in a suitable manner, so that as the nut or block is moved back and forth along the screw the carriage will be correspondingly moved. If the threads be irregular or vary in their distance from each other, it will readily be seen that the traveling carriage will be moved with corresponding irregularity and that the lines on the plates will partake of the same undesirable qualities. The necessity for accuracy will the more readily be appreciated when it is understood that the lines intended to be ruled by this machine are required to be extremely fine and extremely close together. This requires that each line must be in perfect register with its adjoining lines, and one line must not be superposed or overlapped upon another line. In order to secure perfection in this regard, the ruling-wheels by which the lines are ruled or laid are to be adjusted and set to have the lines made by the respective ruling-wheels follow in rotation without any overlapping of the lines, for which purpose the several ruling-wheels are set staggered in their relation to each other, and the plate to be ruled is advanced at each step the distance of a three-line space. This causes the first or leading ruling-wheel to rule its lines a distance apart, so as to leave a two-line space, and the second or intermediate ruling-wheel to rule its lines to follow immediately the lines of the first wheel and leave a space of one line between its line and the line of the first wheel, and the third or final ruling-wheel to rule its lines following the line of the second wheel and filling the space between the lines of the first and second wheels, so that the lines of the three ruling-wheels successively follow each other and rule a space equal to a distance of three lines, thus covering the entire space of the plate to be ruled with the lines. To be available for the purposes of color photography, they should be placed at least three hundred lines to the inch. As a matter of fact, I expect to place a much larger number to the inch, which necessarily reduces them in size and distance apart. Inasmuch as it is necessary to rule or place three different lines side by side, it will be apparent that where three hundred lines to the inch are ruled each one one-hundredth part of the inch contains three lines, one of each of the required colors. As these colors are intended to be laid simultaneously, one following at a desired distance behind the next, it will be apparent that in ruling three hundred lines to the inch—one hundred of each color—the traveling carriage must be moved at each shift for the placement of a new line the distance of one one-hundredth part of an inch. Where six hundred lines are ruled, each shift laterally must be of course to the extent of one two-hundredth part of an inch. To provide the screw and nut with threads of such fineness and delicacy as to do this while giving the screw a complete revolution, will of course greatly increase the difficulty of securing perfect regularity and accuracy in the cutting of the screws. It therefore becomes desirable to make the screws sufficiently coarse to permit them to be cut with accuracy and precision and to employ other means for regulating the extent of the lateral movement with each shift of the plate for the placement of a new line. I do this by employing means for only partially rotating the screw in effecting each lateral shift. The first of these means that I will mention is a wheel $C^2$, mounted at or near one end of the screw. This wheel is made fast with the screw, so that as it is rotated it will rotate the screw. As shown in the drawings, this wheel has a peripheral groove or channel $c^2$ running around it and a series of transverse pins $c^3$, crossing the peripheral channel. This will be readily understood from an inspection of Figs. 6, 7, and 8 of the drawings. I also locate on the screw a lever $C^3$. (Shown in Fig. 6 and in other figures of the drawings.) This lever is loosely mounted on the screw, and preferably between the notched wheel and the bearing $c'$. It carries a pivoted pawl $c^4$, which is provided with a spring $c^5$, which holds the point of the pawl in engagement with the notches formed by the transverse pins. This arrangement will be understood from an inspection of Figs. 7 and 8 of the drawings. As the lever is moved back the point of the pawl is free to slide or pass over the notches or pins; but as the lever is moved forward the point engages the notch or pin immediately in front of it and forces the notched wheel forward to effect a partial revolution of it and of the screw on which it is mounted. A rod $C^4$, pivoted at the upper or free end of the lever, runs forward and is pivoted at its forward end to a vertical arm $C^5$, which extends up from a rock-shaft $C^6$. As this shaft is worked its vertical arm is oscillated or moved back and forth and the rod $C^4$ and the lever $C^3$ moved or reciprocated back and forth. When moved in one direction, the point of the pawl, as already explained, slides over the notches or pins in the wheel $C^2$, and when moved in the other direction it turns or rotates the wheel and the screw a partial revolution, determined by the number of notches or pins that have been passed in the sliding movement of the pawl. To prevent the wheel and the screw from being turned beyond the predetermined portion of a revolution, I arrange another rod $C^7$, which runs from the vertical arm $C^5$ forward toward the notched wheel, so as to swing or oscillate another pawl $c^6$, whose point $c^7$ engages with one of the notches or pins in the wheel $C^2$ just at the instant that the pawl $c^4$ has moved the wheel and screw the predetermined distance. This will readily be understood from an inspection of Figs. 5 and 8 of the drawings. In order to work the rock-shaft $C^6$, I carry it along the front side of the machine to a point about midway, where it terminates in an arm $C^8$, provided with an antifriction-roll $c^8$. Immediately above this antifriction-roll is arranged a cam $C^9$, mounted on a stud or shaft $c^9$, held in suitable bearings. A gear-wheel $C^{10}$ is also mounted on this shaft or stud. The teeth of this gear-wheel are engaged by the teeth of a pinion $c^{10}$, the teeth of which in turn engage with the teeth of a pinion $c^{11}$, mounted on a shaft which carries a pulley $C^{11}$, driven by a belt $c^{12}$, which in turn is driven by a pulley $C^{12}$, driven by any convenient motive power. Thus it will be seen that as power is applied and the train of gears already described put in operation the rock-shaft $C^6$ will be rocked or oscillated through means of the arm and cam already described, so that at predetermined intervals, determined by the contour of the cam-surface, the lever $c^3$ will be moved or reciprocated back and forth and the pawl $c^4$ caused to rotate the notched wheel and the screw the desired portion of a revolution. This can of course be regulated by regulating the extent of the sliding movement of the pawl over the notches or pins in the wheel $C^2$. If, for instance, the wheel $C^2$ be provided with twenty-five notches or pins and the point of the pawl when drawn back is slid to a position that will cause it in its forward movement to engage every fifth notch or pin, it is apparent that the notched wheel $C^2$ and the screw will be turned or rotated one-fifth of a revolution. If, to further illustrate, the threads on the screw be of a size and pitch to move the carriage five one-hundredths part of an inch at each complete revolution, then if the forward movement of the pawl only rotate the wheel and screw one-fifth of a revolution it is obvious that with each forward movement of the pawl the carriage will be shifted laterally only one one-hundredth part of an inch. In this way I am enabled to make the threads of the screw sufficiently large and coarse to secure accuracy and precision, while at the same time using the screw to move the traveling carriage only a desired predetermined distance to enable me to effect the placement of the lines at a desired predetermined distance apart. In this way I am enabled to increase or diminish the distance apart of the lines and their number to the inch simply by regulating the extent of movement of the pawl $c^4$ so as to have it slide over or skip as many notches or pins in the wheel $C^2$ in its sliding movement as desired.

To provide for possible irregularities in the externally-threaded screw $C$ or in the internally-threaded nut or block $C'$, I provide a yoke $C^{14}$, which is rigidly attached to the nut or block and passed over to the rear, where it is provided with a wheel or roll $c^{13}$, traveling on the top of a bar $c^{14}$, which affords it a track or way. This bar is attached to the base or bed by bolts passing through vertically-slotted holes, as shown in Fig. 23, so that it can be adjusted up or down or at either end, so that as the carriage travels from one end of its course to the other a gradual change in the position of the nut can be effected, as the nut can be turned in its relation to the screw as travel takes place as may be necessary or desirable in regulating the desired exact placement of the lines. This method of adjustment is simply intended to provide for possible irregularities and will ordinarily not be required where the threaded screw and nut are cut with the proper degree of perfection and exactitude.

I now come to the mechanism for ruling or placing the lines of dyes or inks on the surface of the plate to be ruled. As the plate is held in an upright or vertical position during the process of ruling and as no movement is imparted to it except laterally from time to time as the carriage and plate-holder are moved, it is apparent that the means employed for ruling the lines must traverse or pass across the surface of the plate in a vertical plane. To this end I arrange a stationary guide-frame D immediately in front of the surface of the plate to be ruled. This guide-frame consists of two vertical parallel standards $d$ and $d'$, preferably trussed, as shown particularly in Figs. 1 and 3 of the drawings, so as to make them rigid and unyielding when performing their functions. The guide-frame terminates in a base $D'$, which rests upon a step or flange of the base or bed, to which it may be fastened by bolts or in any other desired way, as shown in Figs. 1 and 3. It is also preferably bolted to the side of the bed or base by bolts passing through the face of the guide-frame and into the base or bed, as shown particularly in Figs. 1 and 2 of the drawings. The standards $d$ and $d'$ of the guide-frame are arranged parallel to each other and a desired distance apart. In the full-sized machine illustrated in the drawings these standards are about ten inches apart, although, of course, I do not mean to give exact or invariable dimensions. They are connected together at the top by a flat cross-bar $D^2$ (shown particularly in Fig. 1) and preferably cast or formed integral with the guiding-frame. I arrange on the inner or oppositely-directed faces of the standards $d$ and $d'$ parallel flanges, as it were, $d^2$. Each standard is provided with a pulley-wheel $D^3$, around which passes a cable $d^{10}$, fastened at one end to the traveling carriage and carrying a weight W at the other to operate as counterbalance to the weight of the carriage, and thus increase the facility with which it may be moved up and down in the performance of its work. The traveling carriage $D^4$, on which the inking or ruling mechanism is mounted, is provided with laterally-projecting pieces $d^3$ and $d^4$, intended to be received in vertical longitudinal recesses provided in the vertical standards to receive them and to which they are adapted. The laterally-projecting piece $d^3$ terminates in a rectangular recess, while the laterally-projecting piece $d^4$ terminates at its end in an inclined recess in the standard. As the carriage moves up and down these laterally-projecting pieces slide against the recesses of the standards, and to hold the faces of these parts closely together I arrange rolls $d^5$ at the front of the carriage to bear against the flanges $d^2$. These rolls are adjusted against the standards by a spring force or otherwise sufficient to hold them in close and constant contact, so that the faces of the laterally-projecting pieces on the traveling carriage are held in close and constant contact with the faces of the recesses in which they are received. This arrangement will be readily understood by an examination of Fig. 17, where a plan view of the parts is shown. In this way an approximately perfectly steady vertical movement is secured. The importance of this will be obvious when we consider the necessity of ruling smooth, regular, and unbroken lines on the face of the plate of glass arranged in the plate-holder to be ruled.

In order to cause the vertically-traveling carriage to move up and down, I arrange a sprocket-wheel $D^6$ on the shaft of the wheel $C^{11}$, as will be readily understood from an inspection of Fig. 9, so that it will rotate with it. I suspend another sprocket-wheel $D^7$ in a pair of rods $d^6$, passing through holes in the cross-bar $D^2$. These rods may be raised or lowered as desired to change or regulate the distance between the two sprocket-wheels, and thereby the tension of the sprocket-chain $D^8$, passing around them. To permit the rods to be raised or lowered in making changes or adjustments and to be readily fastened again in place, I provide thumb-screws $d^7$. (Shown in Figs. 1 and 11.) The sprocket-chain is provided with a roll $d^9$ at its rear and a projecting pin $d^8$, which extends through the sprocket-chain, and preferably somewhat beyond the front face of the sprocket-chain, to form the pin or stud for mounting the roll, as will be understood from an inspection of Fig. 11 of the drawings. The projecting pin performs no office in the operation of the machine beyond serving as the journal for the roller, and it need not project beyond the face of the sprocket-chain. Two bars $d^9$ are arranged at the front of the vertically-traveling carriage with sufficient space between them to permit the roll $D^9$ to pass between them and ride or travel, as it were, on the lower of the two, as on a way or track. When the traveling carriage approaches its extreme up position, the roll $D^9$ is exactly above the axis of the upper sprocket-wheel, and when it reaches the extreme limit of its down movement the roll is exactly under the axis of the lower sprocket-wheel. In this way the roll $D^9$, while constantly remaining between the two bars, serves to connect the carriage with the sprocket-chain, so that its vertical travel is effected. In this way affirmative or positive power is applied to effect the travel of the carriage in both its upward and downward movements, although, as already explained, the counterweights W relieve the roll and sprocket-chain from most of the weight of the carriage and ruling mechanism in their upward movement.

The ruling-wheels, by which the lines are intended to be placed on the glass plate, are similar to those already shown and described in my application, Serial No. 677,960, filed April 18, 1898, and I need not describe them in detail in this application. They are, however, differently held in position for their work. As three colors are intended to be ruled simultaneously, it is necessary to make provision for the mounting and the operating of three several ruling-wheels, as shown in Figs. 17, 18, and 19 of the drawings, to mention no others. I arrange in the rear of the traveling carriage, as shown in Fig. 17, three recesses $D^5$, in which are mounted three wheel-frames E. These wheel-frames are provided with pintles $e$, (well illustrated in Figs. 18 and 19,) which pass through the wheel-frames and rest in journals in the partitions $e'$, arranged at the sides of the recesses. These pintles are made with great care and attention and so that they can be adjusted endwise with great minuteness and accuracy, so as to exactly adjust and regulate the position of the ruling-wheels. When the wheel-frames have been hung in position on their pintles, the three ruling-wheels will hang side by side, as shown in Fig. 18. To adjust them laterally, so that the lines ruled by them respectively will lie side by side a hundred or more of each kind to the inch without overlapping or being superposed on each other, I employ in the first instance screws E' (shown in Figs. 17, 18, and 19) to secure an approximate adjustment of the wheels in their relative lateral positions. In order, however, to adjust them with the required accuracy and precision to do the fine and delicate work required of them, I employ additional means to place them more completely under the power of the operator. I arrange a screw $E^2$ (shown particularly in Fig. 19) to bear against one end of the pintle upon which the central wheel-frame is mounted, and I mount on the screws E' and $E^2$ levers $e^2$, which are fast to the screws and by which the screws may be given an additional turn, as may be desired in the fine and delicate adjustment of the lateral positions of the ruling-wheels in preparation for their work. These levers pass forward above the traveling carriage and engage calibrated arcs $E^3$, as shown in Fig. 14. By moving the levers up and down on the calibrated arcs according to the scale marked thereon the screws E' and $E^2$ may be given such additional turn in the one direction or the other as may be required to nicely adjust the ruling-wheels in their respective lateral positions. In this way I am able to regulate the ruling-wheels in their proper desired lateral positions.

The ruling-wheels F receive the ink which they rule on the plate from the inking-wheels $f$, which in turn receive it from sponges, wicks, or other fibrous material X, arranged in the holders F', as shown in Figs. 14 and 15, or from tapes or ribbons $x$, as shown in Figs. 24 and 25. The wicks or fibrous material terminate in ink-receptacles $F^2$ and carry the ink through their length and through the ruling-wheels by capillary attraction, so that too great a quantity of ink is never presented to the inking and ruling wheels. The arrangement of these wheels will be readily understood from an inspection of Fig. 14 and need not be further described in detail. Where tapes or ribbons are used, they are mounted on frames W', which receive and carry the inking-wheels $f$. These frames may of course be mounted, held, and supported in any desired way, though they are preferably pivoted to the supporting-arms X', carried by the frames in which the ruling-wheels are mounted and held to their working position by springs $x'$ at their upper ends drawing them toward the ruling-wheels. The tapes or ribbons are held at their upper ends by the cross-pieces $w$ of the frames, which also preferably support depending rods $W^2$, which extend down into the inking-receptacles $F^2$, where they are turned to form bent ends $w'$, on which the lower ends of the ribbons are arranged beneath the surface of the ink. The arrangement will be readily understood from an inspection of Figs. 24 and 25 and need not be further described in detail. The ink desired is carried by capillary attraction up along the tapes or ribbons, so as to sufficiently saturate them to permit the edge of the inking-wheels to receive the desired supply of ink to impart the same to the edge of the ruling-wheels. By adjusting the length of the tapes or ribbons or the distance of the ink-receptacles from the inking-wheels the supply of ink saturating the ribbons or tapes at the point where they are contacted by the wheels can be regulated at will. It is obvious that the supply of ink in the tapes or ribbons will be increased or decreased at the point where the inking-wheels contact them as the distance between such point and the ink-supply is increased or decreased. In this way it is easy to provide for thin or thick placement of the inks in the lines ruled on the plate. I arrange on the shafts which carry the ruling-wheels and in proper proximity thereto rubber-faced wheels $F^3$, that are intended by their contact with the surface of the plate to impart rotation to the shafts, and thereby to the ruling-wheels, so that the contact between the ruling-wheels and the surface of the plate may be only sufficiently close to effect the proper disposal of the ink thereon.

The wheel-frames are hung on their respective pintles in such proximity to the plate to be ruled as that the edge of the inking-wheels in bearing against the plate hold the frames out of plumb, as it were, so that gravity constantly tends to bring the wheels positively against the ruling-plate to do their work; but in order that their contact against the plate may be affirmative, positive, and constant I carry springs G from the upper ends of the wheel-frames back to the upper ends of arms G', mounted on fulcrums $g$ and with their lower ends projecting into position to be contacted by screws $g'$, so that by forcing the lower ends of the arms in by turning the screws and their upper ends out the tension of the springs may be adjusted at pleasure, so as to regulate and determine the pressure of the ruling-wheels against the plates. Flat bars $G^2$, with their segmental ends $g^2$, may be pushed down, and thus cause the wheel-frames to tilt and move the wheels away from the surface of the plate. These bars $G^2$ are also actuated automatically in the operation of the machine, as I will endeavor to explain. At the beginning of the ruling of a plate it is obvious that as the three wheels are arranged side by side and at some distance apart only one of the wheels begins the ruling at the edge of the plate. After it has moved in a sufficient distance the next wheel comes to a point where it may also contact against the surface of the plate and begin to lay its appropriate line. The tension of the spring, however, acting with the gravity of the ruling-frame, would hold the wheel too far advanced for its working position. To overcome this, the bars $G^2$ are pushed down by hand at the beginning of the operation. This, as already explained, holds the ruling-wheels too far out to contact with the surface of the plate. As they move laterally and a ruling-wheel approaches the edge of the plate the bar $G^2$ holding it out is caught by the first depending hook $g^3$, (shown in Fig. 20,) so that as the carriage descends the bar is raised and the wheel-frame freed, so that the tension of the spring can be exerted to move the wheel into its position of contact against the plate. For certain purposes, however, I desire to automatically move the ruling-wheels away from the surface of the plate. To do this, I have arranged pushes $G^3$, $G^4$, and $G^5$, (shown in Fig. 20,) which, striking against the top of the bars $G^2$, force them down and move the wheels away from the plate. As the work progresses, however, the bars $G^2$ are again caught and lifted by the hooks $g^4$ and $g^5$, and when the final push $G^5$ is reached each bar is pushed down and each wheel moved back and allowed to remain back, as it then passes off the edge of the plate and is returned to its initial position to begin the ruling of another plate. This construction and operation will be understood from an inspection of Fig. 20 of the drawings.

It is important, not to say essential, that the surface of the plate as the bars are being ruled on shall be kept dry and in proper condition to receive the inks without their spreading through the gelatin coating or emulsion with which the surface of the plate is provided to receive them. To this end means should be provided for projecting upon the surface of the plate a stream or current of air of proper temperature to not only dry the dyes or inks as they are ruled on the plate, but also to keep the plate itself, or rather the gelatin emulsion forming the coating or surface, in a dry condition and prevent it from absorbing moisture from the atmosphere. This stream or current of air should also, in order to secure the best results, be applied or projected upon the plate in proximity to the point being ruled, and therefore it should be adapted to travel over the surface of the plate with the ruling mechanism and move up and down with such mechanism. To effect these results, I provide a pipe H. (Shown, for instance, in Figs. 1, 11, and 14.) This pipe is supported upon or attached to in any suitable manner the vertical traveling carriage which carries the mechanism. It is provided with laterally-projecting branches $h$, (shown in Figs. 11 and 14,) which bend toward the plate and adjacent to the ruling-wheel, so that the stream or current of air forced into the pipe H passes out through the laterally-projecting branches against the surface of the plate adjacent to the point where the ruling is going on. The air thus projected against the plate keeps the gelatin or emulsion in its proper condition of dryness, so that it can receive and hold the inks or dyes without permitting them to run or spread, largely irrespective of the atmosphere as to humidity or dryness. Inasmuch, however, as the pipe H, as shown in the drawings, is located below the ruling-wheels, it is apparent that there will be a portion of the surface of the plate above the ruling-wheels not directly subjected to the action of the streams or currents of air passing out through the branch pipes $h$. In order to bring this portion of the plate under the influence of the air, I provide vertical branch pipes H', extending up from the pipe H at sufficient distance to bring their upper ends above the ruling-wheels. I turn the upper ends of these branch pipes toward the plate, as shown at $h'$ in Fig. 14, so that the currents or streams of air passing through them will be directed against the surface of the plate. In this way I am able to subject the entire surface of the plate where the ruling is being done to the currents of air. The air thus supplied to the plate is conveyed to the pipe H from any convenient force or fan $H^2$ through means of a flexible pipe connection $h^2$, as will be readily understood from an inspection of Fig. 1. This permits the pipe H to move up and down with the ruling mechanism without interfering in any way with the operations of the machine.

Of course any convenient motive power may be employed for the actuation of the machine, but, as illustrated in the drawings, I employ an electric motor I. The shaft of the motor carries a wheel or roll $i$, which contacts with the periphery of the wheel $C^{13}$, mounted upon and fast with the shaft which carries the pulley $C^{12}$. When the current is turned on by the manipulation of the proper switches, rotation is imparted to the driving-pulley through the rotation of the motor-shaft. The power supplied through the motor-shaft to the wheel $C^{13}$ effects the rotation of the shaft and pulley-wheel $C^{12}$, which causes the belt $c^{12}$ to travel so as to rotate the wheel $C^{11}$ and the pinion $c^{11}$, mounted on this shaft. This causes the rotation of the pinion $c^{10}$ and the gear $C^{10}$, together with its shaft $c^9$, on which the cam $C^9$ is mounted. The contour of this cam bearing on the roll $c^8$ causes the lateral arm $C^8$ to be depressed during each revolution and the rock-shaft $C^6$ to be rocked. This causes the vertical arm $C^5$ to be moved back and forth and through the rod $C^4$ the lever $C^3$ to be reciprocated or oscillated back and forth. As this takes place the notched wheel $C^2$ is rotated partial revolutions through the instrumentality of the pawl $c^1$, as already explained. This causes the screw C to be rotated a partial revolution with each reciprocation of the lever $C^2$ and the carriage B, carrying the plate-holder and plate, to be moved longitudinally and horizontally along the base or bed, so as to carry the plate being ruled past the mechanism which applies the lines of inks or dyes.

After the plate has been moved to the extent of its travel past the ruling mechanism for placing the lines and has assumed the position shown in Fig. 1 it is necessary to employ means to carry it back to its initial position to permit the introduction and ruling of another plate. It is desirable also that this return of the carriage and of the plate shall be effected as rapidly and expeditiously as practicable. While it necessarily travels slowly in one direction, there is nothing to prevent its being returned rapidly in the other. To effect this return travel of the carriage and plate-holder, the belt $c^{12}$ is thrown off the pulley $C^{12}$, so that in the return movement of the carriage the operative parts of the mechanism will be disengaged from the motor. The wheel $C^{13}$ is preferably provided with a V-shaped peripheral channel, as shown in Figs. 1 and 2. A wheel $I'$, preferably provided with a V-shaped periphery corresponding to the V-shaped peripheral groove or channel in the wheel $C^{13}$, is mounted on the end of a movable or swinging shaft $i^2$, which runs transversely across the end of the machine, as shown in Fig. 4. This shaft is provided with a worm $I^2$, which engages the teeth of a pinion $I^3$, mounted on a shaft $i^3$, supported in suitable bearings, as shown in Fig. 4, and running horizontally through a channel in the bottom of the bed or base. The other end of this shaft is provided with a pulley $I^4$, carrying when in operation a traveling belt $i^4$, which passes around the pulley $I^5$, as shown in Fig. 5, at the end of the screw C and preferably fastened to the notched wheel $C^2$, as shown in Fig. 6. The shaft $i^2$ at the end carrying the pulley $I'$ is mounted in the end of a lever J, pivoted at $i'$ to the base or bed of the machine. This lever lies at the side of a bent piece $j$, operating as a catch. When a plate has been ruled and the parts have reached the position shown in Fig. 1 and it is desired to return the carriage and the plate-holder to their initial position to begin the ruling of another plate, the belt $c^{12}$ is disengaged and the lever J moved down, so that the pulley $I'$ is moved up against the wheel $C^{13}$. This causes the rotation of the shaft $i^2$ and through its connections, as already traced and pointed out, the wheel $I^5$, so as to impart a rapid reverse rotation to the screw C. This effects the rapid return of the carriage and plate-holder to their initial position.

The ruling required is exceedingly fine and delicate and must at the same time be exact and uniform and so that the lines will consecutively follow each other, with one line contacting the preceding line, so that the entire space will be filled by the lines lying side by side. This requires that there shall be great rigidity and firmness as regards the support for the plate of glass and that the plate of glass shall occupy the position in which there shall be the least tendency to sagging or binding in the plate arising from its weight. This is best secured by having the plate of glass supported in a vertical position on its edge. It is also necessary that the ruled lines shall be even and distinct and without any blurring or wavering. To best secure this, the feed of the ink to the wheels and the placement of the same by the wheels onto the plate should be such that the deposit of the ink on the wheels and its transfer from the wheels onto the plate are of the quantity required to produce lines of the desired width and density without blurring or spreading. This proportionate placement of the ink is best secured by locating the plate in a vertical position and moving the wheels vertically across its surface and by having the required quantity of ink received by the ruling-wheels at their rear edges and carried forward for transference to the plate. The inking of the ruling-wheels from the rear prevents an accumulation of ink on the edge of the wheels, as the tendency of the ink will be to flow downward or backward as the wheels rotate, leaving the forward or acting edge without any excess of ink thereon. This is assisted by the vertical position of the plate, as with a horizontal position for the plate the ruling-wheels would either be above or below the plate, with a tendency, if above, of having the ink flow along the edge of the wheels toward the lowest or contact point and so depositing too much ink, thereby creating a blur and spread, and with a tendency, if below, of having the ink flow along the edge of the wheels away from the highest or contact point, and so depositing too little ink. Furthermore, with the inking-wheels above the plate their weight would be added to the sagging tendency of the plate or require means to support them at just the right point of contact with the plate, and with the wheels below the plate it would be difficult, if not impossible, to hold the wheels up to the exact point constantly required for their work, to say nothing of the difficulty of regulating and manipulating the wheels and their adjuncts. The wheels as now arranged in their pivoted or swinging frames constantly rest against the plate by gravity, which tends to bring them into a plumb position to rest with the desired firmness of contact against the plate. The vertical position of the carrying-frame, supporting the plate to be ruled in an upright position, in conjunction with the vertically-operating ruling-wheels, secures all the advantages above pointed out, enables all of the operating parts to be readily accessible, retains the glass to be ruled in a position for ready observation, permits the course of the ruling-wheels to be gaged and examined, and, if not operating properly, the necessary changes readily and quickly made to correct any irregularity or defect. These advantages and this result would not be secured by using a horizontal bed with a horizontal plate thereon and horizontally-operating marking or ruling wheels.

While I have described the construction and operation of my machine with considerable minuteness of detail, yet I desire it to be understood that I do not intend to limit myself to structural features merely, except as I may specify the same in my claims, as I contemplate various changes in construction and arrangement without departing from the general principle of operation already described and explained.

I claim—

1. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, and means for moving the ruling mechanism up and down, substantially as described.

2. In a ruling-machine, the combination of a bed or base, a carriage longitudinally and horizontally movable thereon, means for moving the carriage a predetermined distance and holding it in a state of rest during the operation of ruling mechanism, a vertical plate-holder mounted on the carriage and carried therewith, ruling mechanism adjacent to the front of the plate-holder, and means for moving the ruling mechanism up and down, substantially as described.

3. In a ruling-machine, the combination of a bed or base, a carriage longitudinally and horizontally movable thereon, means for automatically moving the carriage a predetermined distance and holding it in a state of rest during the operation of ruling mechanism, a vertical plate-holder mounted on the carriage and carried therewith and capable of being swung into a horizontal position, ruling mechanism adjacent to the front of the plate-holder when in its vertical position, and means for moving the ruling mechanism up and down, substantially as described.

4. In a ruling-machine, the combination of a bed or base, a carriage longitudinally and horizontally movable thereon, means for automatically moving the carriage a predetermined distance and holding it in a state of rest during the operation of ruling mechanism, a vertical plate-holder mounted on the carriage and carried therewith and provided with a transparent permanent back, means for holding a plate to be ruled against the permanent back, ruling mechanism adjacent to the front of the plate-holder, and means for moving the ruling mechanism up and down substantially as described.

5. In a ruling-machine, the combination of a bed or base provided with a longitudinal horizontal channel, longitudinal horizontal tracks or ways arranged in the channel, a carriage mounted on the tracks or ways and longitudinally and horizontally movable thereon, means for moving the carriage, a vertical plate-holder mounted on the carriage and carried therewith, ruling mechanism adjacent to the front of the plate-holder, and means for moving the ruling mechanism up and down, substantially as described.

6. In a ruling-machine, the combination of a bed or base provided with a longitudinal horizontal channel, longitudinal horizontal tracks or ways arranged in the channel, a carriage mounted on the tracks or ways through a spring or cushioned connection and longitudinally and horizontally movable thereon, means for moving the carriage, a vertical plate-holder mounted on the carriage and carried therewith, ruling mechanism adjacent to the front of the plate-holder, and means for moving the ruling mechanism up and down, substantially as described.

7. In a ruling-machine, the combination of a bed or base provided with a longitudinal angular upper face at one side and a longitudinal inclined upper face at the other, a carriage provided with a longitudinal angular lower face at one side and a longitudinal angular lower face at the other adapted to be received in the angular and inclined upper faces of the bed or base, means for moving the carriage longitudinally and horizontally, a vertical plate-holder mounted on the carriage and carried therewith, ruling mechanism adjacent to the front of the plate-holder, and means for moving the ruling mechanism up and down, substantially as described.

8. In a ruling-machine, the combination of a bed or base provided with a longitudinal angular upper face at one side and a longitudinal inclined upper face at the other, a carriage provided with a longitudinal angular lower face at one side and a longitudinal inclined lower face at the other adapted to be received in the angular and inclined upper faces of the bed or base and supported through a spring or cushioned connection, means for moving the carriage longitudinally and horizontally, a vertical plate-holder mounted on the carriage and carried therewith and capable of being swung into a horizontal position, ruling mechanism adjacent to the front of the plate-holder when in its vertical position, and means for moving the ruling mechanism up and down, substantially as described.

9. In a ruling-machine, the combination of a bed or base provided with a longitudinal angular upper face at one side and a longitudinal inclined upper face at the other, a carriage provided with a longitudinal angular lower face at one side and a longitudinal inclined lower face at the other adapted to be received in the angular and inclined upper faces of the bed or base, means for moving the carriage longitudinally and horizontally, a vertical plate-holder mounted on the carriage and carried therewith and provided with a transparent permanent back, means for holding a plate to be ruled against the permanent back, ruling mechanism adjacent to the front of the plate-holder, and means for moving the ruling mechanism up and down, substantially as described.

10. In a ruling-machine, the combination of a bed or base provided with a longitudinal angular upper face at one side and a longitudinal inclined upper face at the other, a carriage provided with a longitudinal angular lower face at one side and a longitudinal inclined lower face at the other adapted to be received in the angular and inclined upper faces of the bed or base and supported therein through a spring or cushioned connection, means for moving the carriage longitudinally and horizontally, a vertical plate-holder mounted on the carriage and carried therewith and provided with a transparent permanent back and capable of being swung into a horizontal position, means for holding a plate to be ruled against the permanent back, ruling mechanism adjacent to the front of the plate-holder when in its vertical position, and means for moving the ruling mechanism up and down, substantially as described.

11. In a ruling-machine, the combination of a bed or base, a carriage longitudinally and horizontally movable thereon, an internally-threaded nut non-rotatably mounted on the carriage, an externally-threaded rotatable screw engaging the threaded nut, means for imparting to the threaded screw a predetermined portion of a revolution at desired intervals, a vertical plate-holder mounted on the carriage and carried therewith, ruling mechanism adjacent to the front of the plate-holder, and means for moving the ruling mechanism up and down, substantially as described.

12. In a ruling-machine, the combination of a bed or base provided with a longitudinal horizontal channel, a carriage longitudinally and horizontally movable thereon, an internally-threaded nut non-rotatably mounted on the carriage and depending in the longitudinal horizontal channel with its axis longitudinally and horizontally disposed, an externally-threaded rotatable screw supported in suitable bearings and longitudinally and horizontally disposed in the longitudinal horizontal channel and engaging the threaded nut, means for imparting to the threaded screw a predetermined portion of a revolution at desired intervals, a vertical plate-holder mounted on the carriage and carried therewith and capable of being swung into a horizontal position, ruling mechanism adjacent to the front of the plate-holder when in its vertical position, and means for moving the ruling mechanism up and down, substantially as described.

13. In a ruling-machine, the combination of a bed or base, provided with a longitudinal horizontal channel, a carriage longitudinally and horizontally movable thereon, an internally-threaded nut non-rotatably mounted on the carriage and depending in the longitudinal horizontal channel with its axis longitudinally and horizontally disposed, an externally-threaded rotatable screw supported in suitable bearings and longitudinally and horizontally disposed in the longitudinal horizontal channel and engaging the threaded nut, means for imparting to the threaded screw a predetermined portion of a revolution at desired intervals, a vertical plate-holder mounted on the carriage and carried therewith and provided with a transparent back, means for holding a plate to be ruled against the permanent back, ruling mechanism adjacent to the front of the plate-holder, and means for moving the ruling mechanism up and down, substantially as described.

14. In a ruling-machine, the combination of a bed or base, a carriage longitudinally and horizontally movable thereon, an internally-threaded nut non-rotatably mounted on the carriage, an externally-threaded rotatable screw engaging the threaded nut, a notched wheel fixedly mounted on the screw, a lever loosely mounted on the screw, means for reciprocating or moving the lever backward and forward at desired intervals, means for engaging the notched wheel as the lever is moved in one direction and imparting to it and to the threaded screw a predetermined portion of a revolution, a vertical plate-holder mounted on the carriage and carried therewith, ruling mechanism adjacent to the front of the plate-holder, and means for moving the ruling mechanism up and down, substantially as described.

15. In a ruling-machine, the combination of a bed or base, a carriage longitudinally and horizontally movable thereon, an internally-threaded nut non-rotatably mounted on the carriage, an externally-threaded rotatable screw engaging the threaded nut, a notched wheel fixedly mounted on the screw, a lever loosely mounted on the screw, a pawl pivotally mounted on the lever and adapted to move in engagement and disengagement with a notch in the wheel dependent on its direction of movement, means for reciprocating or moving the lever backward and forward at desired intervals and through means of the pawl of imparting to the notched wheel and to the screw a predetermined portion of a revolution at desired intervals, a vertical plate-holder mounted on the carriage and carried therewith, ruling mechanism adjacent to the front of the plate-holder, and means for moving the ruling mechanism up and down, substantially as described.

16. In a ruling-machine, the combination of a bed or base, a carriage longitudinally and horizontally movable thereon, an internally-threaded nut non-rotatably mounted on the carriage, an externally-threaded rotatable screw engaging the threaded nut, a notched wheel fixedly mounted on the screw, a lever loosely mounted on the screw, a rock-shaft provided with a vertical arm, a connection between the vertical arm and the lever, means for rocking the rock-shaft and imparting a reciprocating or back-and-forward movement to the lever, means for engaging the notched wheel as the lever is moved in one direction and imparting to it and to the threaded screw a predetermined portion of a revolution, a vertical plate-holder mounted on the carriage and carried therewith, ruling mechanism adjacent to the front of the plate-holder, and means for moving the ruling mechanism up and down, substantially as described.

17. In a ruling-machine, the combination of a bed or base, a carriage longitudinally and horizontally movable thereon, an internally-threaded nut non-rotatably mounted on the carriage, an externally-threaded rotatable screw engaging the threaded nut, a notched wheel fixedly mounted on the screw, a lever loosely mounted on the screw, a rock-shaft provided with a vertical arm at one end and with a laterally-extending arm at the other end, a connection between the vertical arm and the lever, a rotatable cam having a desired irregular contour contacting with the lateral arm on the rock-shaft and periodically depressing it and rocking the shaft and oscillating the lever backward, means for oscillating the lever forward, means for engaging the notched wheel as the lever is oscillated forward and imparting to it and to the threaded screw a predetermined portion of a revolution, a vertical plate-holder mounted on the carriage and carried therewith, ruling mechanism adjacent to the front of the plate-holder and means for moving the ruling mechanism up and down, substantially as described.

18. In a ruling-machine, the combination of a bed or base, a carriage longitudinally and horizontally movable thereon, an internally-threaded nut non-rotatably mounted on the carriage, an externally-threaded rotatable screw engaging the threaded nut, a notched wheel fixedly mounted on the screw, a lever loosely mounted on the screw, a pawl pivotally mounted on the lever and adapted to move in engagement and disengagement with a notch in the wheel dependent upon its direction of movement, a rock-shaft provided with a vertical arm at one end and with a laterally-extending arm at the other end, a connection between the vertical arm and the lever, a rotatable cam having a desired irregular contour contacting the lateral arm on the rock-shaft and periodically depressing it and rocking the shaft and oscillating the lever backward, means for rotating the cam, means for oscillating the lever forward, means for engaging the notched wheel as the lever is oscillated forward and imparting to it and to the threaded screw a predetermined portion of a revolution, means for preventing the notched wheel and the threaded screw from rotating beyond the desired extent, a vertical plate-holder mounted on the carriage and carried therewith, ruling mechanism adjacent to the front of the plate-holder, and means for moving the ruling mechanism up and down, substantially as described.

19. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, a sprocket wheel and chain mechanism for moving the ruling mechanism up and down, substantially as described.

20. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, vertical guides or ways for maintaining the vertical movement of the ruling mechanism, a sprocket wheel and chain mechanism for moving the ruling mechanism up and down and counterbalance-weights for assisting in restoring the ruling mechanism to its up position, substantially as described.

21. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, sprocket wheel and chain mechanism for moving the ruling mechanism up and down, and means for adjusting the distance between the sprocket-wheels, substantially as described.

22. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, a vertically-movable carriage on which the ruling mechanism is mounted and a sprocket wheel and chain mechanism for moving the vertically-movable carriage and the ruling mechanism up and down, substantially as described.

23. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, a vertically-movable carriage on which the ruling mechanism is mounted provided with parallel bars at its front with a space between them, a sprocket wheel and chain mechanism, and means for connecting the sprocket-chain to the movable carriage through the space between the parallel bars, substantially as described.

24. In a ruling-machine, the combination of a bed or base, a carriage longitudinally and horizontally movable thereon, means for moving the carriage, a vertical plate-holder mounted on the carriage and carried therewith, ruling mechanism adjacent to the front of the plate-holder, a vertically-movable carriage on which the ruling mechanism is mounted provided with parallel bars at its front with a space between them, a sprocket wheel and chain mechanism, a laterally-extending pin carrying a wheel or roll arranged in the space between the parallel bars, whereby as the sprocket-chain travels in a constant direction around the sprocket-wheels the vertically-movable carriage is moved up and down through the engagement of the roll in the space between the parallel bars, substantially as described.

25. In a ruling-machine, the combination of a vertical plate-holder, a vertically-movable carriage, means for moving the carriage up and down, ruling mechanism mounted on the carriage, and means for adjusting the ruling mechanism laterally, substantially as described.

26. In a ruling-machine, the combination of a vertical plate-holder, a vertically-movable carriage, means for moving the carriage up and down, ruling mechanism mounted on the carriage, means for adjusting the ruling mechanism laterally, and means for moving the ruling mechanism toward or from a plate to be ruled, substantially as described.

27. In a ruling-machine, the combination of a vertical plate-holder, a vertically-movable carriage, means for moving the carriage up and down, ruling mechanism mounted on the carriage in pendent pivoted frames, means for adjusting the frames with the ruling mechanism laterally, and means for swinging the frames and moving the ruling mechanism toward or from a plate to be ruled, substantially as described.

28. In a ruling-machine, the combination of a vertical plate-holder, a vertically-movable carriage, means for moving the carriage up and down, ruling mechanism mounted on the carriage in pendent pivoted frames, means for adjusting the frames with the ruling mechanism laterally, and means for holding the ruling mechanism back and away from a plate to be ruled, substantially as described.

29. In a ruling-machine, the combination of a vertical plate-holder, a vertically-movable carriage, means for moving the carriage up and down, ruling mechanism mounted on the carriage in pendent pivoted frames, means for adjusting the frames with the ruling mechanism laterally, means for holding the ruling mechanism back and away from a plate to be ruled, and means for automatically releasing the ruling mechanism and permitting it to be moved toward a plate to be ruled, substantially as described.

30. In a ruling-machine, the combination of a vertical plate-holder, a vertically-movable carriage, means for moving the carriage up and down, ruling mechanism mounted on the carriage in pendent pivoted frames, means for adjusting the frames with the ruling mechanism laterally, means for holding the ruling mechanism back and away from a plate to be ruled, means for automatically actuating the means for holding the ruling mechanism back, and means for releasing the ruling mechanism and permitting it to be moved toward a plate to be ruled, substantially as described.

31. In a ruling-machine, the combination of a vertical plate-holder, a vertically-movable carriage, means for moving the carriage up and down, ruling mechanism mounted on the carriage in a desired relation to a plate to be ruled, and means for drying the plate being ruled, substantially as described.

32. In a ruling-machine, the combination of a vertical plate-holder, a vertically-movable carriage, means for moving the carriage up and down, ruling mechanism mounted on the carriage in a desired relation to a plate to be ruled, and means mounted upon and carried with the carriage for drying the plate being ruled, substantially as described.

33. In a ruling-machine, the combination of a vertical plate-holder, a vertically-movable carriage, means for moving the carriage up and down, ruling mechanism mounted on the carriage having a desired relation to a plate to be ruled, means mounted upon and carried with the carriage for applying a current or stream of air to the plate being ruled, substantially as described.

34. In a ruling-machine, the combination of a bed or base, a carriage longitudinally and horizontally movable thereon, an internally-threaded nut non-rotatably mounted on the carriage, an externally-threaded rotatable screw engaging the threaded nut, means for imparting to the threaded screw a predetermined portion of a revolution at desired intervals, and moving the carriage in a desired direction, a shaft reversely rotatable to the rotation of the screw and passing longitudinally through the base, means for reversely rotating the shaft, and driving means between the shaft and the screw for reversing the rotation of the screw and returning the carriage to its initial position, substantially as described.

35. In a ruling-machine, the combination of a bed or base, a carriage longitudinally and horizontally movable thereon, an internally-threaded nut non-rotatably mounted on the carriage, an externally-threaded rotatable screw engaging the threaded nut, means for imparting to the threaded screw a predetermined portion of a revolution at desired intervals and moving the carriage in a desired direction, a worm-shaft and worm, means for imparting rotation to them and through them to a shaft running longitudinally through the bed or base, and means actuated by such shaft for reversing the rotation of the screw and returning the carriage to its initial position, substantially as described.

ELLSWORTH E. FLORA.

Witnesses:
THOMAS A. BANNING,
THOMAS B. McGREGOR.